Oct. 6, 1942.　　　　G. W. TIDD　　　　2,297,815
AIR ROTOR
Filed May 2, 1939　　　　2 Sheets-Sheet 1
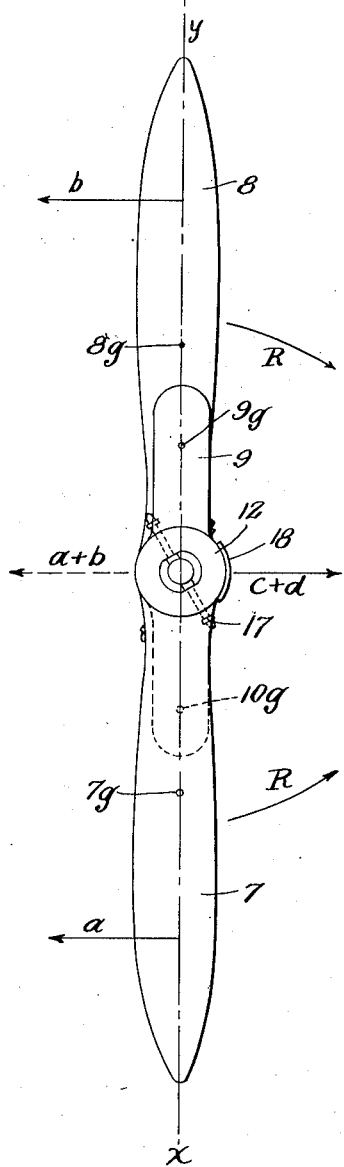
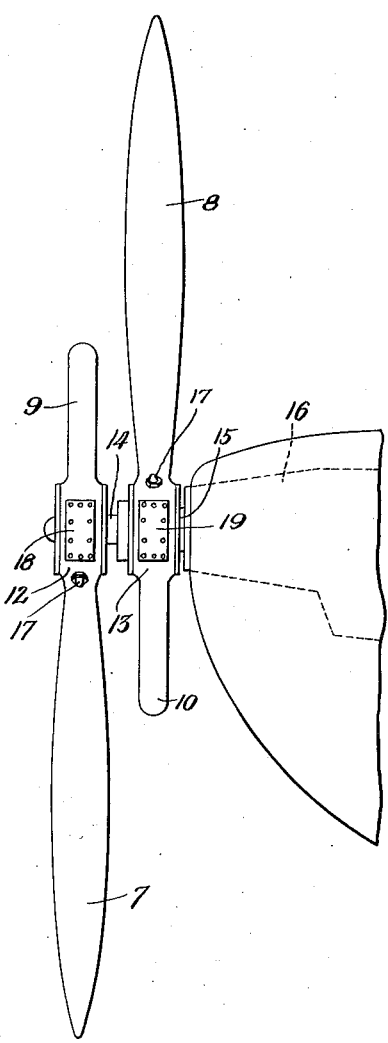
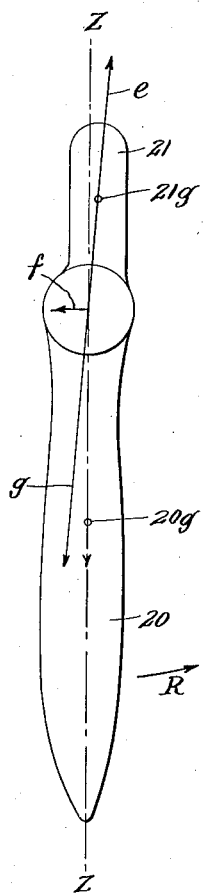
INVENTOR
Gage W. Tidd
BY
Synnestvedt & Lechner
ATTORNEYS Oct. 6, 1942.         G. W. TIDD         2,297,815
AIR ROTOR
Filed May 2, 1939         2 Sheets-Sheet 2

INVENTOR
Gage W. Tidd
BY
Synnestvedt + Lechner
ATTORNEYS

Patented Oct. 6, 1942

2,297,815

UNITED STATES PATENT OFFICE 2,297,815

AIR ROTOR

Gage W. Tidd, Willow Grove, Pa., assignor to Autogiro Company of America, Willow Grove, Pa., a corporation of Delaware Application May 2, 1939, Serial No. 271,319

8 Claims. (Cl. 170—159)

This invention relates to air rotors and to multiple rotor assemblies, and more particularly to the balancing of rotors of unsymmetrical form having dissymmetry of rotational drag. The invention is especially applicable to the balancing of counterweighted single blade rotors of the propeller or propulsive airscrew type commonly used on aircraft, and also of the lifting or suspension type which are adapted to be driven, either for normal flight operation as in a helicopter, or only for starting or take-off, as in certain types of autorotationally actuable sustaining rotors.

The invention is particularly concerned with the balancing of single-bladed air rotors of the types above mentioned, one of the primary objects of the invention being the provision of a rotor which is very smooth in operation during drive thereof.

More specifically, the invention has in view balancing out or counteracting a force which has heretofore disturbed smoothness of operation of counterbalanced single-bladed rotors. In this connection it may be noted that this disturbing force is especially noticeable in coaxial tandem single-bladed rotors, for reasons which will be brought out more fully hereinafter, and the invention provides for substantially complete counteraction of the disturbing force even in tandem rotor arrangements.

The nature of the invention and also objects and advantages in addition to those mentioned above will be more apparent from consideration of the following description referring to the accompanying drawings, in which—

Figure 1 is a front elevational view of a pair of tandem coaxial single-bladed and counterweighted propulsive airscrews;

Figure 2 is a side elevational view of the same as mounted at the nose of an aircraft;

Figure 4 is a front elevational view of a single-bladed counterweighted propeller incorporating a modification;

Figure 3:
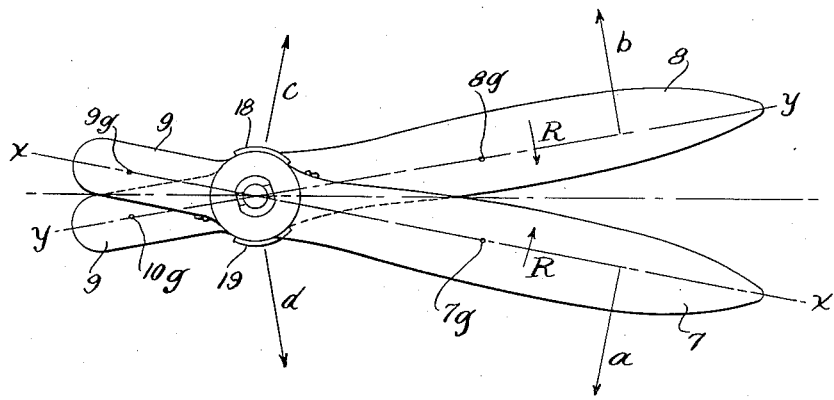
Figure 3 is a front elevational view of the arrangement of Figures 1 and 2 but with the two propellers in different relative positions.

Referring first to Figures 1, 2 and 3, the single blades of the two propellers appear at 7 and 8, the counterweights therefor being shown at 9 and 10. The blades and counterweights are connected, respectively, with hubs 12 and 13 which, in turn, are mounted on coaxial shafts 14 and 15 adapted to be driven in opposite directions as by means of a transmission mechanism shown in outline at 16 in Figure 2. The direction of rotation of the two rotors is indicated by the arrows R. While the invention is not limited thereto, it is shown as applied to the type of propeller in which the hub is mounted on its shaft by means of a pivot 17 providing freedom for displacement movement of the blade and counterweight as a unit with respect to the mounting shaft in a direction producing pitch change. Specifically, the pivot for each of the propellers is so angled with respect to the longitudinal axis of the blade as to form an acute angle at the leading side of the blade axis, with the result that as the blade swings forwardly, the pitch angle is reduced and vice versa.

Ordinarily, in counterbalancing a single-bladed rotor or a propeller, the center of gravity of the counterweight, as shown for example at $9g$ and $10g$ in Figures 1 and 3, is located diametrically opposite to the center of gravity of the blade as shown, for example, at $7g$ and $8g$. In other words, the center of gravity of the counterweight is disposed on the line $x$—$x$ or $y$—$y$ passing through the rotor axis and the center of gravity of the blade. This effectively counterbalances the action of centrifugal force on a single blade provided, of course, that the mass and offset of the counterweight are appropriate.

I have found, however, that whenever torque is being transmitted through the propeller shaft or equivalent axis member, the general type of counterbalancing above referred to does not provide complete dynamic balance, there being an unbalanced force remaining which I have found to arise from the fact that the counterweight and the blade have different rotational drag. Ordinarily, the blade would have substantially greater rotational drag than the counterweight, and when viewed as in Figures 1 and 3, this differential between the drag of the counterweight and the blade results in an unbalanced force in a direction opposite to the direction of rotation as indicated by the arrow $a$ applied to the blade 7, or $b$ applied to blade 8.

As the blade rotates, therefore, the unbalanced force tends to cause the hub and mounting shaft to move in a circular path when the rotor is being driven, in consequence of which an undesirable vibration is set up, especially in rotors or propellers adapted to operate at relatively high R. P. M. In some instances this unbalanced force is not prohibitive where only a single propeller is used. With tandem propellers, however, the force is highly objectionable for the reason that when the blades are disposed diametrically opposite to each other as in Figure 1, the forces $a$ and $b$ are added together and are transmitted to the hub and mounting shaft in the same direction, as indicated by the dotted arrow $a+b$, while in the position where one blade overlies the other (see Figure 3) the forces $a$ and $b$ cancel each other. The difference in effect in these two relative positions of the blades tends to vibrate or reciprocate the mounting shafts in a direction transverse the axis of rotation. The vibration effect in a tandem propeller arrangement is thus substantially greater than would result from doubling the out of balance effect of a single propeller.

With the above in mind, the invention contemplates counteracting this unbalanced force by employing a weight appropriately mounted on the rotor or its mounting shaft. Such a weight may conveniently take the form of a plate 18 or 19 angularly offset from the counterweight by approximately 90°, and offset from the axis of the propeller to that side toward which the leading edge of the blade is presented. Centrifugal force acts on these weights in the direction indicated by the arrows $c$ and $d$ in Figure 3, from which it will be noted that arrow $c$ extends in the opposite direction from arrow $a$, and arrow $d$ opposite to arrow $b$.

When the blades are positioned in diametrically opposite positions as in Figure 1, the forces $c$ and $d$ are added as indicated by the arrow $c+d$, this force being opposite to that represented by $a+b$. In this way, by appropriate choice of mass and radial offset of the weights 18 and 19, the unbalanced force arising from the differential rotational drag between the counterweight and the blade may be effectively counteracted either in a single blade arrangement or in a tandem arrangement of the type illustrated.

With regard to the tandem arrangement, note further that, as shown in Figure 3, as the two blades approach parallelism, the forces $c$ and $d$ counteract each other, as do also the forces $a$ and $b$, thus maintaining proper balance even in the tandem type installation.

Preferably, the value of the weight 18 or 19 is chosen to counteract the unbalanced drag force at the normal operating speed, although it is to be noted that even throughout a wide variation of rotational speeds, the counteraction of the unbalanced force will be quite accurate, since the centrifugal force of the weight (18 or 19) varies as the square of the R. P. M., as does also the drag of the propeller. The only variable affecting the drag force is the drag coefficient, but in the normal range of angles of attack, the drag coefficient varies only slightly. Thus, the foregoing manner of balancing, for practical purposes, is substantially accurate throughout the normal range of operating conditions.

With further reference to the tandem propeller arrangement of Figures 1, 2 and 3, it is pointed out that this type of installation with oppositely rotating propellers is important in order to cancel out the propeller driving torque and thus eliminate rolling moments in the body of the machine. In turn, tandem single blade propellers are especially useful for this purpose for a number of reasons, including maintaining maximum diameter and a minimum number of blades in the propeller assembly. Therefore, the provision of an effective balancing system for single-bladed counterweighted propellers in accordance with this invention is of substantial importance, since it provides for virtually complete and accurate balancing under all normal conditions, notwithstanding the fact that when single-bladed rotors are disposed in tandem, the unsymmetrical drag forces tend to set up very severe vibrations.

In the arrangement of Figure 4, a blade 20 is shown as being counter balanced by a counterweight 21, the center of gravity $21g$ of which is offset from line $z$—$z$ passing through the propeller axis and the center of gravity $20g$ of the blade, the direction of offset being toward that side of line $z$—$z$ on which the leading edge of the blade 20 is presented. With the center of gravity $21g$ located in this manner, the action of centrifugal force thereon is in the direction $e$, which is opposite to the arrow $g$ representing the resultant of the unbalanced drag effect $f$ and the action of centrifugal force on the blade indicated by the arrow passing through the center of gravity $20g$. A single counter weight may thus be employed to effect the balancing of two forces.

Figure 5:
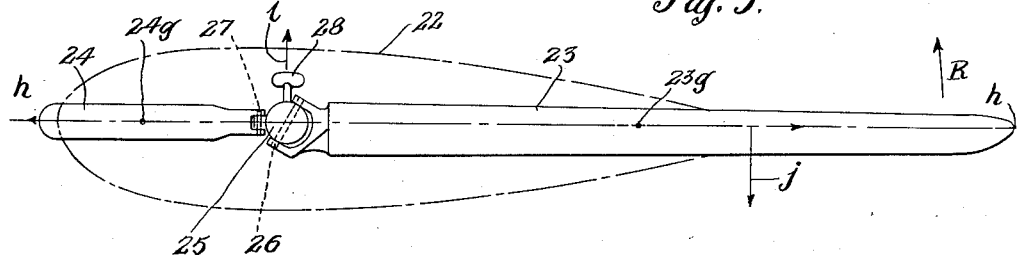
Figure 5 is a top plan view of an aircraft of the helicopter type incorporating a single-bladed counterweighted lifting rotor to which the invention has been applied.

Turning now to the showing of Figure 5, the body of an aircraft is indicated, in outline, at 22, this craft being equipped with a single-bladed lifting or sustaining rotor incorporating blade 23 and counterweight 24. The blade 23 is pivotally connected with the hub 25 by means of pivot 26 providing for conjoint upward and downward and pitch change movement of the blade. The counterweight may also be pivotally connected with the hub as indicated at 27.

In this arrangement the center of gravity $24g$ of the counterweight is located on line $h$—$h$ passing through the axis of the hub, and the center of gravity $23g$ of the blade. Weight 28 is connected with the hub 25, preferably in a manner to rotate with the hub but not move with the blade during oscillation of the latter on its pivot 26. This weight 28 has such mass and is so offset as to produce a force $i$ opposing the force $j$ representing the differential in drag as between the blade 23 and the counterweight 24.

Figure 6:
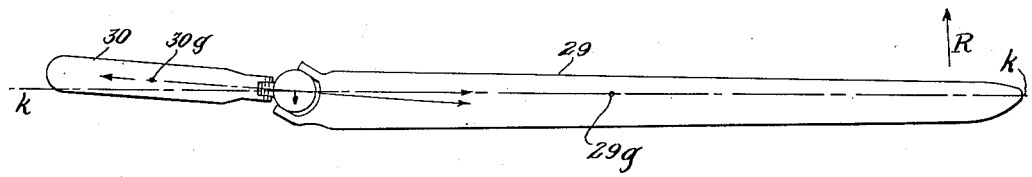
Figure 6 is a top plan view of another lifting rotor similar to that of Figure 5, but illustrating a modified arrangement.

In Figure 6, there is shown a blade 29, similar to that of Figure 5, and a counterweight 30, the center of gravity of the latter $30g$ being offset from the line $k$—$k$ passing through the rotor axis and the center of gravity $29g$ of the blade.

It will be noted that as to the manner of counteracting the unbalanced force arising from difference in drag of the blade and counterweight, the arrangements of Figures 5 and 6 are similar, respectively, to the arrangements of Figures 1 and 4. The details of the arrangements of Figures 5 and 6, therefore, need not be considered further, since the same principles apply.

With regard to Figures 5 and 6, it is noted that the application of the balancing system of this invention is of especial advantage in the helicopter type lifting or sustaining rotor, in which the rotor is driven through the hub during normal operation. The balancing, however, is effective also in the type of sustaining rotor which is capable of autorotation or air actuation, at those times during which the rotor is driven, as, for instance, when on the ground prior to effecting take-off. By way of illustration, reference is made to the type of aircraft in which the rotor is driven while on the ground, with the blades at zero pitch, to a high R. P. M., for example twice the normal autorotational flight speed, the rotor drive being disconnected and the blade pitch increased to effect direct take-off. In an aircraft of this type the balancing system of the present invention is of substantial advantage because of the relatively high speed at which the rotor is driven prior to take-off. While the unbalanced force resulting from differential drag disappears or is, at least, very materially reduced when torque is not being transmitted through the rotor axis, in view of which the counterweighting would no longer provide accurate balancing, the inaccuracy is not an important factor, for the reason that when the rotor is operating autorotationally, the speed of rotation is much lower, for instance about one-half the speed of drive prior to take-off.

In accordance with the invention, a highly effective balancing means is provided for a single-bladed air rotor of a variety of types, even including multiple or tandem arrangements thereof.

The term "rotor" as used herein (unless otherwise qualified by the context) includes bladed propellers, airscrews, sustaining rotors or the like, whether arranged to move through the air axially, edgewise or at any intermediate angle.

I claim:

1. A single-bladed air rotor adapted to be driven through an axis member, said rotor incorporating counterweight means having rotational drag appreciably less than that of the single blade, the counterweight means being positioned to substantially counterbalance the action of centrifugal force on said blade and the center of gravity of the counterweight means being offset from a line containing the center of gravity of the blade and intersecting the rotor axis, the direction of offset being to that side of said line to which the leading edge of the blade is presented to substantially counteract the unbalanced force arising from the difference in drag of the counterweight means and blade when the rotor is being driven.

2. A single-bladed air rotor having an axis member through which torque is transmissible, said rotor incorporating counterweight means having rotational drag appreciably less than that of the single blade and providing substantial counterbalancing of the action of centrifugal force on said blade and the center of gravity of the counterweight means being offset from a line containing the center of gravity of the blade and intersecting the rotor axis, the direction of offset being to that side of said line to which the leading edge of the blade is presented to substantially counteract the unbalanced force arising from the difference in drag of the counterweight means and blade when torque is being transmitted through said axis member.

3. A single-bladed air rotor adapted to be driven through an axis member, said rotor incorporating a counterweight with its center of gravity disposed substantially diametrically opposite the center of gravity of the blade and providing substantial counterbalancing of the action of centrifugal force on the blade, the counterweight having rotational drag appreciably less than that of the blade, and a weight rotatable with the rotor and offset from a line passing through the rotor axis and the center of gravity of the blade in the direction toward which the leading edge of the blade is presented, the degree of offset and mass of said weight providing substantial counteraction of the unbalanced force arising from the difference in drag between the counterweight and the blade when the rotor is driven.

4. A pair of oppositely rotatable tandem coaxial single-bladed air rotors, each having an axis member through which torque is transmissible, each of said rotors further incorporating counterweight means having rotational drag appreciably less than that of its single blade and providing substantial counterbalancing of the action of centrifugal force on said blade and the center of gravity of the counterweight means being offset from a line containing the center of gravity of the blade and intersecting the rotor axis, the direction of offset being to that side of said line to which the leading edge of the blade is presented to substantially counteract the unbalanced force arising from the difference in drag of the counterweight means and blade when torque is being transmitted through said axis member.

5. A single-bladed air rotor adapted to be driven through an axis member, said rotor incorporating a counterweight with its center of gravity disposed substantially diametrically opposite the center of gravity of the blade and providing substantial counterbalancing of the action of centrifugal force on the blade, the counterweight having rotational drag appreciably less than that of the blade, and a weight mounted on the rotor hub and offset from a line passing through the rotor axis and the center of gravity of the blade in the direction toward which the leading edge of the blade is presented, the weight and counterweight being angularly offset from each other approximately 90° and providing substantial counteraction of the unbalanced force arising from the difference in drag between the counterweight and the blade when the rotor is driven.

6. A single-bladed air rotor having an axis member through which torque is transmissible, means providing freedom for displacement movements of the blade in a direction transverse its rotative path, said rotor incorporating counterweight means having rotational drag appreciably less than that of the single blade and providing the center of gravity of the counterweight means being offset from a line containing the center of gravity of the blade and intersecting the rotor axis, the direction of offset being to that side of said line to which the leading edge of the blade is presented to substantially counteract the action of centrifugal force on said blade and substantial counteraction of the unbalanced force arising from the difference in drag of the counterweight means and blade when torque is being transmitted through said axis member.

7. A pair of oppositely rotatable tandem coaxial single-bladed air rotors each having an axis member through which torque is transmissible, each of said rotors further having a counterweight with its center of gravity disposed substantially diametrically opposite the center of gravity of the blade and providing substantial counterbalancing of the action of centrifugal force on the blade, the counterweight having rotational drag appreciably less than that of the blade, and each of said rotors further having a weight mounted on the rotor hub and offset from a line passing through the rotor axis and the center of gravity of the blade in the direction toward which the leading edge of the blade is presented to provide substantial counteraction of the unbalanced forces arising from the difference in drag between the counterweight and the blade when torque is being transmitted through the rotor axis member.

8. A single-bladed aircraft sustaining rotor adapted to be driven through an axis member, the blade of said rotor being of relatively large radial dimension and said rotor incorporating counterweight means positioned to substantially counterbalance the action of centrifugal force on said blade, the blade and counterweight means being pivotally mounted on the axis member to provide freedom for swinging movement thereof in a direction transverse a plane perpendicular to the axis of rotation, the center of gravity of the counterweight means being offset from a line containing the center of gravity of the blade and intersecting the rotor axis, the direction of offset being to that side of said line to which the leading edge of the blade is presented to substantially counteract the unbalanced forces arising from the difference in drag of the counterweight means and blade when the rotor is being driven.

GAGE W. TIDD.

2,277,815

GAGE W. TIDD.

It is hereby certified that error appears in the printed specification of the above numbered patent requiring correction as follows: Page 3, second column, line 42, claim 6, after "providing" insert --substantial counterbalancing of the action of centrifugal force on said blade and--; lines 48, 49 and 50, same claim, strike out "the action of centrifugal force on said blade and substantial counteraction of"; and that the said Letters Patent should be read with this correction therein that the same may conform to the record of the case in the Patent Office.

Signed and sealed this 8th day of December, A. D. 1942.

(Seal)

Henry Van Arsdale,
Acting Commissioner of Patents.